US009158750B2

(12) United States Patent
Matveief et al.

(10) Patent No.: US 9,158,750 B2
(45) Date of Patent: *Oct. 13, 2015

(54) METHOD AND SYSTEM TO PROCESS AN ELECTRONIC FORM

(75) Inventors: Anatole A. Matveief, San Jose, CA (US); Darrell Dykstra, Ontario (CA); William Ie, Mountain View, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1223 days.

This patent is subject to a terminal disclaimer.

(21) Appl. No.: 13/024,075

(22) Filed: Feb. 9, 2011

(65) Prior Publication Data

US 2011/0131480 A1 Jun. 2, 2011

Related U.S. Application Data

(63) Continuation of application No. 11/810,270, filed on Jun. 5, 2007, now Pat. No. 7,900,132.

(51) Int. Cl.
*G06F 17/00* (2006.01)
*G06F 17/24* (2006.01)

(52) U.S. Cl.
CPC .................... *G06F 17/243* (2013.01)

(58) Field of Classification Search
CPC .................................................. G06F 17/243
USPC ................................................. 715/221–226
See application file for complete search history.

(56) References Cited

U.S. PATENT DOCUMENTS

| 7,269,256 | B2 | 9/2007 | Rosen |
| 7,313,757 | B2 | 12/2007 | Bradley et al. |
| 7,409,632 | B1 * | 8/2008 | DiRienzo ....................... 715/226 |
| 7,584,417 | B2 * | 9/2009 | Friend et al. .................. 715/224 |
| 7,607,078 | B2 | 10/2009 | Geva et al. |
| 7,610,548 | B1 | 10/2009 | Brinkman et al. |
| 7,644,350 | B2 * | 1/2010 | Piersol ........................... 715/221 |
| 7,644,351 | B1 | 1/2010 | Portnoy et al. |
| 7,688,954 | B2 | 3/2010 | Gatzke et al. |
| 7,689,899 | B2 | 3/2010 | Leymaster et al. |
| 7,735,144 | B2 * | 6/2010 | Pravetz et al. .................. 726/30 |
| 2001/0032215 | A1 | 10/2001 | Kyle et al. |
| 2002/0109718 | A1 | 8/2002 | Mansour et al. |

(Continued)

FOREIGN PATENT DOCUMENTS

| WO | WO-2008151217 | A2 | 12/2008 |
| WO | WO-2008151217 | A3 | 12/2008 |

OTHER PUBLICATIONS

"U.S. Appl. No. 11/810,270, Notice of Allowance mailed Oct. 29, 2010", 13 pgs.

(Continued)

*Primary Examiner* — Cong-Lac Huynh
(74) *Attorney, Agent, or Firm* — Shook, Hardy & Bacon, L.L.P.

(57) ABSTRACT

A method and system to process an electronic form is provided. The system may include a communications module to receive a request to digitally sign an electronic form, the electronic form being direct rendered, a suspend module to respond to the request by suspending direct rendering, and a signed content generator to generate a signed version of the electronic form. The signed version of the electronic form is to reflect a state of the electronic form at the time of the request digitally sign the electronic form.

18 Claims, 6 Drawing Sheets

(56) References Cited

U.S. PATENT DOCUMENTS

| | | | |
|---|---|---|---|
| 2002/0194131 A1* | 12/2002 | Dick | 705/51 |
| 2003/0056171 A1 | 3/2003 | Yone et al. | |
| 2003/0070080 A1 | 4/2003 | Rosen | |
| 2004/0139327 A1* | 7/2004 | Brown et al. | 713/176 |
| 2004/0197029 A1* | 10/2004 | Brundage et al. | 382/306 |
| 2004/0205534 A1* | 10/2004 | Koelle | 715/507 |
| 2004/0230891 A1* | 11/2004 | Pravetz et al. | 715/511 |
| 2005/0132201 A1* | 6/2005 | Pitman et al. | 713/176 |
| 2005/0210263 A1* | 9/2005 | Levas et al. | 713/182 |
| 2005/0216742 A1* | 9/2005 | Wong et al. | 713/176 |
| 2005/0268216 A1 | 12/2005 | Hayes et al. | |
| 2006/0136422 A1 | 6/2006 | Matveief et al. | |
| 2006/0143462 A1* | 6/2006 | Jacobs | 713/181 |
| 2006/0198514 A1 | 9/2006 | Lyseggen et al. | |
| 2006/0213993 A1* | 9/2006 | Tomita | 235/454 |
| 2006/0253773 A1 | 11/2006 | Hsieh | |
| 2006/0288269 A1 | 12/2006 | Oppenlander et al. | |
| 2007/0078786 A1* | 4/2007 | Bous et al. | 705/74 |
| 2007/0118732 A1* | 5/2007 | Whitmore | 713/155 |
| 2007/0300057 A1* | 12/2007 | Corcoran et al. | 713/154 |
| 2007/0300145 A1 | 12/2007 | Perelman et al. | |
| 2008/0034213 A1* | 2/2008 | Boemker et al. | 713/176 |
| 2008/0098291 A1 | 4/2008 | Bradley et al. | |
| 2008/0307298 A1 | 12/2008 | Matveief et al. | |
| 2008/0313186 A1* | 12/2008 | Marsh | 707/9 |
| 2009/0025087 A1* | 1/2009 | Peirson et al. | 726/27 |
| 2010/0088585 A1* | 4/2010 | Piersol | 715/222 |
| 2010/0179962 A1* | 7/2010 | Schuster | 707/769 |
| 2010/0287378 A1* | 11/2010 | Goldman et al. | 713/176 |
| 2014/0052617 A1* | 2/2014 | Chawla et al. | 705/39 |

OTHER PUBLICATIONS

"U.S. Appl. No. 11/810,270, Non-Final Office Action mailed May 13, 2010", 7 pgs.

"U.S. Appl. No. 11/810,270, Response filed Aug. 13, 2010 to Non-Final Office Action mailed May 13, 2010", 10 pgs.

"International Application Serial No. PCT/US2008/065726, Search Report mailed Nov. 9, 2009", 6 pgs.

"International Application Serial No. PCT/US2008/065726, Written Opinion mailed Nov. 9, 2009", 5 pgs.

Alsaid, et al., "Digitally Signed Documents—Ambiguities and Solutions", Google, (2004), 1-8.

Berbecaru, et al., "", Towards Concrete Application of Electronic Signature Google, (2001), 1-16.

Brown, "Digital Signatures: Are They Legal for Electronic Commerce?", IEEE 1994, 75-79.

Hastings, et al., "Common Format for Information that is Digitally Signed: A Final Report", Google 2001, 1-20.

Honkala, Mikko, et al., "Secure Web Forms with Client-Side Signatures", Web Engineering; LNCS. vol. 3579 XP019013538, (Jul. 6, 2005), 340-351.

Pharow, et al., "Electronic Signatures for Long-lasting Storage Purposes in Electronic Archives", Google Apr. 27, 2004, 279-287.

* cited by examiner

METHOD AND SYSTEM TO PROCESS AN ELECTRONIC FORM

CROSS-REFERENCE TO RELATED APPLICATIONS

This application is a continuation of U.S. application Ser. No. 11/810,270, filed on Jun. 5, 2007, the benefit of priority of which is claimed herein, and which is incorporated herein by reference in its entirety.

TECHNICAL FIELD

This application relates to a method and system to process an electronic form.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Some existing products offer a comprehensive architecture for electronic document creation, collaboration, and process management. In an architecture that distinguishes between an electronic form template and electronic form data, the template and content associated with the electronic form may be stored separately and then merged to produce a form object when an electronic form processing application (e.g., Adobe® Acrobat®) receives a request to open an electronic form. The application next generates a version of the requested electronic form, utilizing the form object, in a static presentation format, such as, for example, in Adobe® Portable Document Format (PDF). The application then renders the generated version of the requested electronic form to the screen.

Each time a user modifies the form data, e.g., using interactive elements of the electronic form, the application stores the modified form data, generates a modified version of the entire form in a static presentation format, and then renders the visible portion of the generated modified version to the screen.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
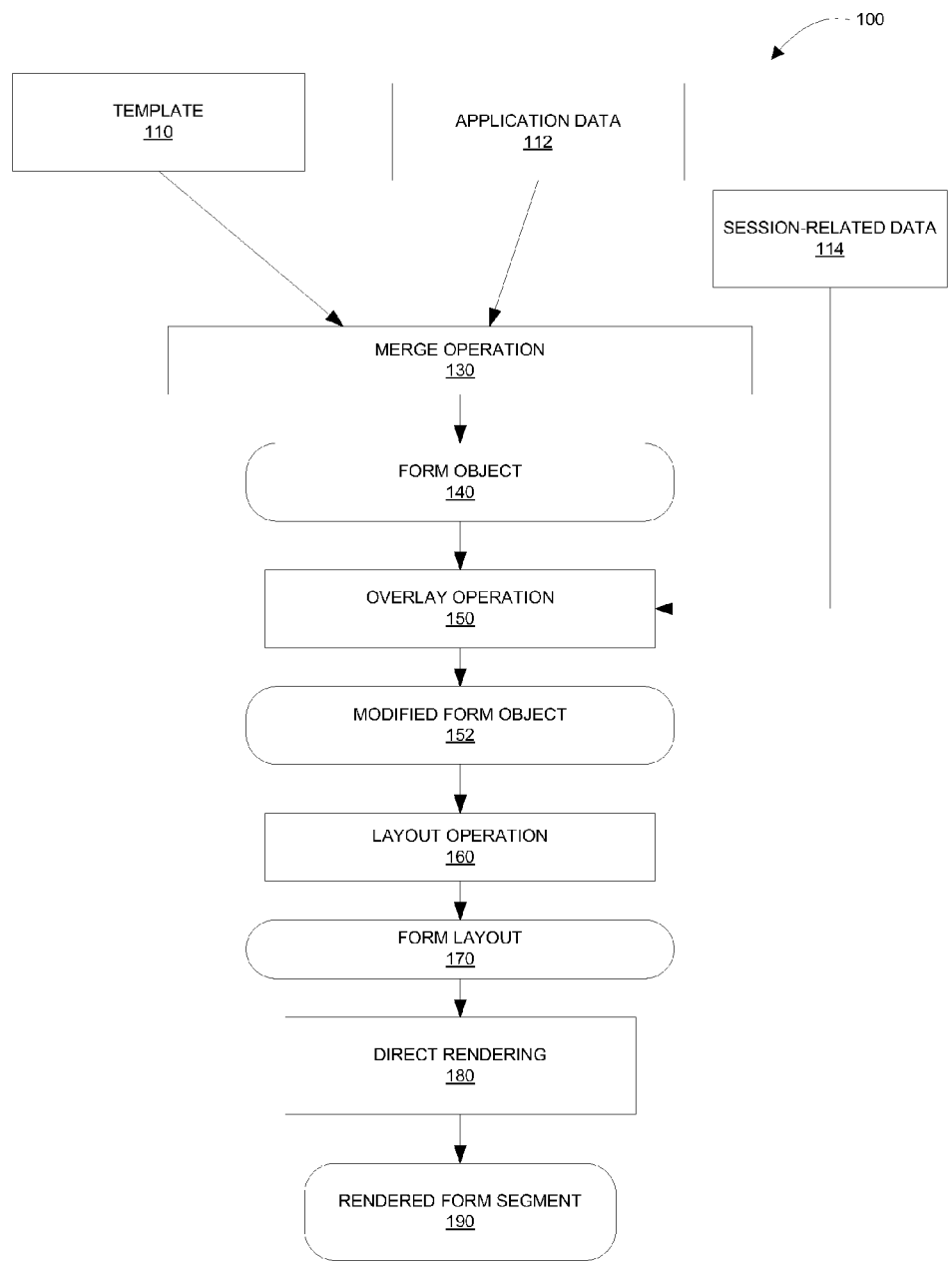
FIG. 1 shows an architecture utilized to process an electronic form, in accordance with an example embodiment.

In one example embodiment, a system is provided to permit direct rendering of an electronic form. Direct rendering may be described as a technique where a system, e.g., a form processing application, does not generate an intermittent static representation of the entire content of the electronic form. Instead, a form processing application may be configured to render only a currently visible portion of the electronic form, and invalidate the rendered content whenever a new portion of the electronic form is requested to be visible. Because an intermittent static representation of the content that is not designated as visible does not need to be generated each time the electronic form is modified, and consequently does not need to be maintained in memory, the direct rendering approach may reduce memory usage for electronic form processing and may result in improved performance.

A form processing system may be configured to permit a user to digitally sign an electronic form and generate a so-called four corner signature. When a form processing application detects a request to digitally sign an electronic form, the application suspends direct rendering and the associated interactivity features and generates a static representation of the electronic form that reflects the state of the form at the time of the request. The generated static representation, e.g., a representation in Adobe® Portable Document Format (PDF), is saved by the form processing application for later access. The application then resumes direct rendering, so that no static representation of the form needs to be maintained in memory, while users are permitted to interact with and update the electronic form.

Thus, in one example embodiment, a form processing system may be configured to support two modes of operation. In a direct rendering mode, the system may be tuned for improved performance and small size of the file representing an electronic form. In a digital signature mode, the direct rendering may be suspended and a static, visually accurate, and reproducible representation of an electronic form may be generated and stored.

In an example embodiment, the system to process an electronic form may be implemented in the context of the eXtensible Markup Language (XML) Forms Architecture (XFA). XFA provides a template-based grammar and a set of processing rules that may allow the implementing of interactive electronic forms. A template-based grammar may define interactive components, such as form fields, checkboxes, drop-down menus, etc. Users may be permitted to interact with an electronic form by supplying values, selecting options and otherwise providing input associated with various interactive components. XFA distinguishes between an electronic form template and electronic form data. Electronic form data may include application data, as well as any persisting session-related data. A form object generated by merging a form template with application data and overlaying session-related data onto it may be referred as the content of an electronic form. A template, typically, may define presentation, calculations and interaction rules for the electronic form, while the electronic form data may represent a user's application data as well as any session related data. Although an electronic form template and electronic form data are often packaged together, an electronic form template and electronic form data may exist as separate entities.

An XFA form may include content defined in the template, such as lines, rectangles, and text, for example. The content derived from a template may, in an example embodiment, be manipulated by script. Some of the XFA form content may be content that is defined later, e.g., when the data is merged with the template or when the electronic form field values are filled in by an end-user.

When a blank electronic form associated with a template is first loaded, a user sees an interactive electronic form that represents the layout, graphics, and fields defined in the XFA template. Initially, the only data in the electronic form are default values defined in the template. When an XFA processing application introduces data to an XFA form, it may associate each item from the user's application data with a respective dynamic container, e.g., a form field or a check box. The process of associating a data item with a dynamic container may be termed "data binding." A form processing system that permits direct rendering of an electronic form and also provides a mechanism for digitally signing a direct rendered electronic form may be implemented in the context of an example architecture, as discussed below.

An example architecture 100 to process an electronic form is illustrated in FIG. 1. An electronic form may, in many cases, embody a complex "application packaged as a document" that may utilize a template-based grammar where the template associated with an electronic form defines presentation, calculations and interaction rules, while the content of the electronic form comprises the application data of the user. As mentioned above, the template and the data of an electronic form may be separate entities.

In order to load a previously saved electronic form, the template associated with the electronic form is merged with the application data. In the context of the architecture 100, in an example embodiment, a template 110 representing a blank electronic form is merged with application data 112 in a process of binding, utilizing a merge operation 130. Application data of a user may include the electronic data values that are mapped to the respective field values in the form, as specified or defined by the template 110. Such mapping determines which electronic form field values are to be saved in an application data repository and is also used to populate the fields of the electronic form when a user requests loading of the form.

The result of the merge operation 130 is an electronic form object 140. The electronic form object 140, while generated based on the associated template 110 and the associated application data 112, may not always reflect the complete state of the electronic form, because the electronic form may include additional changes that occurred during an earlier edit session. For example, a user may enter custom data into a so-called unbound field. An unbound field is an electronic form field that is not associated with any item in the application data of a user. A user may also choose to override a pre-calculated value in an electronic form field. As a result, the custom value in the unbound field and any overridden calculation will not be reproduced by the merge operation 130.

In some embodiments, where it may be beneficial to preserve the purity of the application data by avoiding mixing it with session data, such as the color of the border of a form field, the architecture 100 may include a repository for session-related data, in addition to a regular data repository that stores application data. The data stored in such an additional repository, designated as session-related data 114 in FIG. 1, may be referred to as the attributes and properties of an electronic form. Session-related data may be stored in a document object model (DOM) and may comprise any changes made to the electronic form that are not already captured in the regular data repository.

After the merge operation 130 is completed, but prior to performing any calculations required by the template, the value of each item of the session-related data 114 may be pushed onto the appropriate electronic form component. In order to restore a more complete previous state of the electronic form, the architecture 100 may utilize an overlay operation 150. In one example embodiment, the overlay operation 150 acts on the electronic form object 140 by overlaying onto the electronic form object 140 any session-related data 114 that may be designated as persisting data even though this data is not part of the application data 112.

As mentioned above, the session-related data 114 may include values of electronic form fields that are not reflected in the application data 112, e.g., the values of unbound electronic form fields. The session-related data 114 may further include values associated with overridden calculations, characteristics affecting the appearance of the electronic form, as well as other data values that not part of the application data.

Returning to FIG. 1, the overlay operation 150 modifies the form object 140 in memory. The result of the overlay operation 150, a modified form object 152, is further processed by a layout operation 160. A form layout 170 generated by the layout operation 160 may be utilized, e.g., by a graphics component associated with a form processing system to generate a graphical (or static) representation of the electronic form. The form layout 170 may be used by a rendering mechanism 180 to create a rendered segment 190 of the electronic form.

The components of the architecture 100, including the rendering mechanism 180, may be implemented as a form processing application, such as, for example, Adobe® Acrobat®. In one example embodiment, the rendering mechanism 180 may operate in different modes, depending on the requests issued by a user. When operating in direct rendering mode, the rendering mechanism 180 may permit direct rendering that bypasses the step of generating a static representation of the entire electronic form during an editing session. When a user instructs the associated forms processing application to digitally sign an electronic form, the rendering mechanism 180 may switch to a digital signature mode, where direct rendering and any interactivity within the form definition is suspended and the form processing application creates a static representation of the electronic form that reflects the state of the electronic form at the time of the request. Such static representation of an electronic form, in one example embodiment, may be created in a Portable Document Format (PDF). An example embodiment of a system comprising a rendering mechanism (such as the rendering mechanism 180) may be described with reference to FIG. 2.

Figure 2:
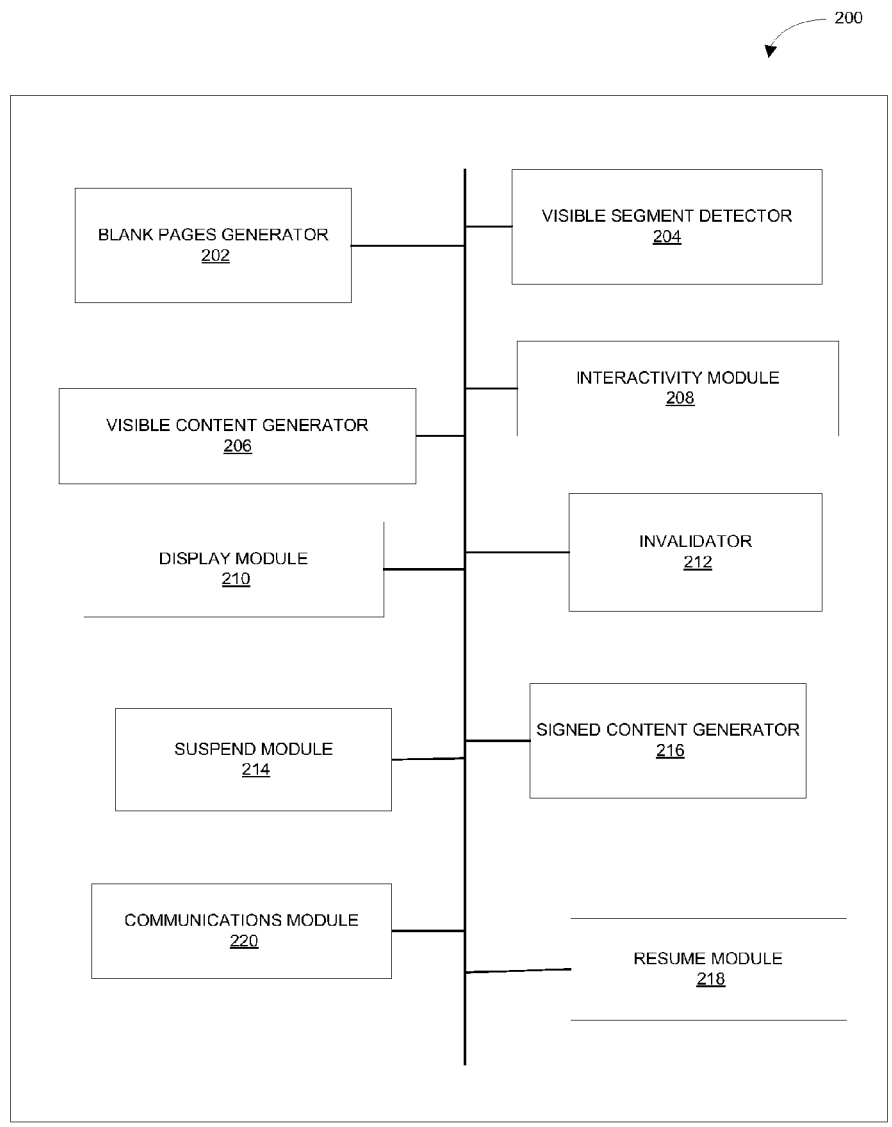
FIG. 2 is a block diagram illustrating a system, in accordance with an example embodiment, to process an electronic form.

FIG. 2 is a block diagram illustrating a system 200, in accordance with an example embodiment, to process an electronic form. The system 200 may be configured to implement the rendering mechanism 180 discussed with reference to FIG. 1. The system 200, in one example embodiment, comprises a plurality of modules to effectuate direct rendering of a subject electronic form, such as a blank pages generator 202, a visible segment detector 204, and a visible content generator 206. The blank pages generator 202 may be configured to access a layout generated for the subject electronic form, as described with reference to FIG. 1, and to generate a plurality of pages associated with the subject form. The generated pages, in one example embodiment, are blank pages, as they are not filled with any static or interactive content. In another embodiment, the generated pages may be substantially blank with one exception, which is the signature fields themselves. The signature fields, in one example embodiment, may be created as PDF annotations, which are interactive in nature.

The visible segment detector 204 may be configured to determine which segment of the subject form should be visually presented on an associated display device. The visible segment detector 204 may be configured to cooperate with the visible content generator 206. The visible content generator 206 may be configured to generate content associated with the detected visible segment of the subject electronic form. An interactivity module 208 may be configured to provide any interactive components that may be associated with the segment of the subject form that should be visually presented on an associated display device. In one example embodiment, a form processing application may be provided to permit a user to view one or more complete pages of an electronic form associated with a generated layout. A form processing application may also permit a user to view one or more portions of one or more pages of an electronic form. Thus, it will be appreciated, that a visible segment of an electronic form may comprise one or more complete pages, an incomplete page, or a plurality of portions of different pages. The content generated by the visible content generator 206 may be provided to a display module 210 configured to display the generated content on an associated display device.

In one example embodiment, the system 200 includes an invalidator 212 configured to invalidate the rendered content, when the content should no longer be viewable on a display device. For example, a user, in the process of editing or viewing an electronic form, may switch from one page to another, or issue a command instructing the associated form processing application to zoom in on a particular page. The invalidator 212 may be configured to monitor for such event and invalidate the currently displayed content in response to the event.

The system 200, in one example embodiment, includes a plurality of modules to permit to digitally sign a direct rendered electronic form. These modules include a suspend module 214, a signed content generator 216, and a resume module 218. The suspend module 214 may be configured to suspend direct rendering mode and to place the system 200 into a digital signature mode, where a static representation of the entire subject electronic form is generated, regardless of whether the visible segment of the subject electronic form includes the entire form or just a portion of the form. In one example embodiment, the suspend module 214 may operate to detect a request to generate a digital signature for the subject electronic form and to suspend direct rendering in response to the request and then engage the signed content generator 216.

The signed content generator 216 may be configured to determine that a request to generate a digital signature has been issued and that direct rendering has been suspended and, in response, generate a signed version of the subject electronic form. The signed version of the subject electronic form, in one embodiment, reflects the state of the form at the time of the request to sign the subject electronic form. The signed version of the subject electronic form may comprise a static graphical representation of the entire subject electronic form.

The system 200 may also include a communications module 220 that may be configured to receive and process messages associated with requests being issued in the course of an editing session of an electronic form. For example, the communications module 220 may receive a request to load an electronic form, to save an electronic form, to perform a particular edit operation permitted by the associated form processing application, to digitally sign an electronic form, as well as other requests. Example operations performed by a form processing application in general and by the system 200 in particular may be discussed with reference to FIG. 3.

Figure 3:
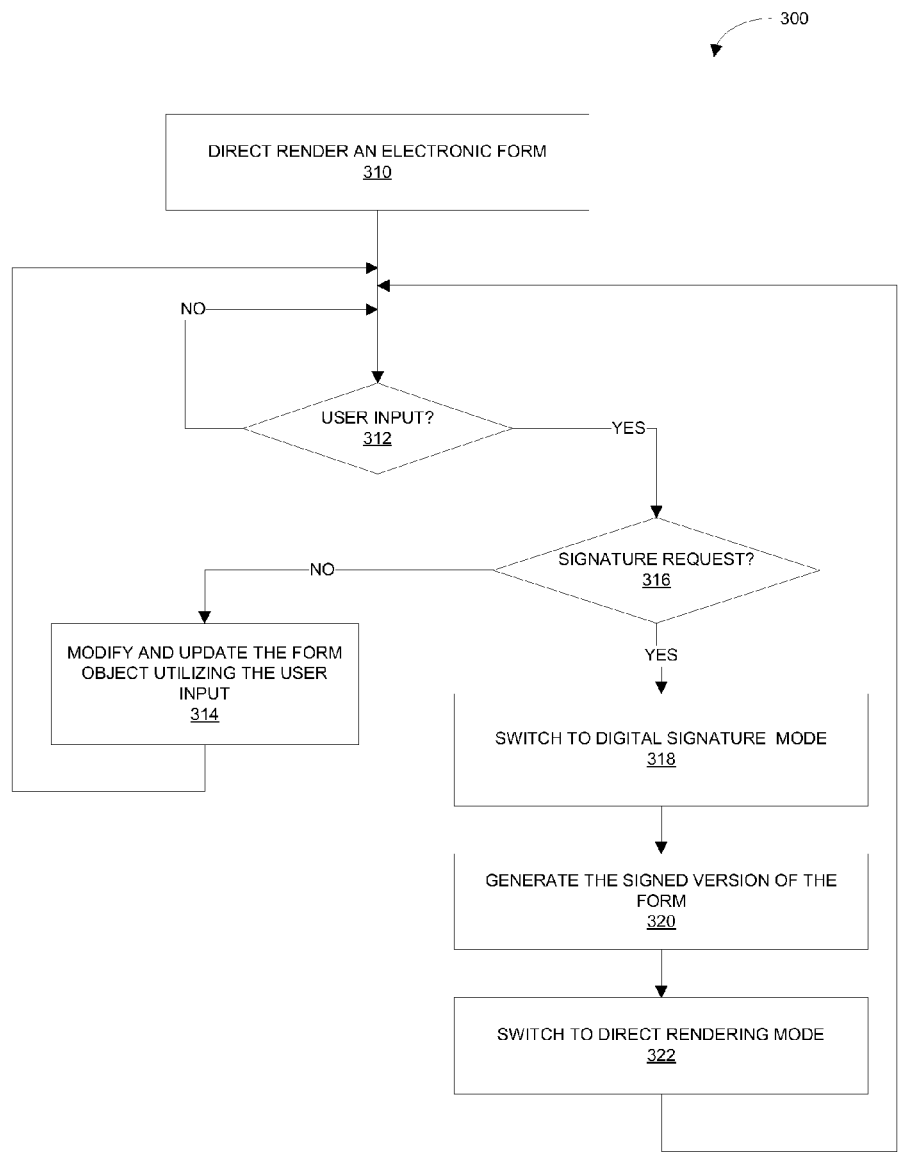
FIG. 3 is a flow chart illustrating a method to process an electronic form, in accordance with an example embodiment.

FIG. 3 is a flow chart illustrating a method 300 to process an electronic form, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 1 and FIG. 2 described above. By way of example, FIG. 3 is discussed with reference to a particular type of an electronic form, an XFA form, and to a particular type of a form processing application, an XFA processing application.

As shown in FIG. 3, the method 300 commences at operation 310. At operation 310, a subject XFA form is direct rendered in response to a request to load the form. As mentioned above, direct rendering refers to a technique where a system, e.g., an XFA processing application, does not generate an intermittent static representation of the entire content of the electronic form but instead renders only the segment of the form that should be visually available to a user.

The XFA processing application monitors the user input during a form processing session. If the monitoring module (e.g., the communications module 220 of FIG. 2) detects user input at operation 312 and also determines that the user input is associated with a digital signature request (operation 316), the XFA processing application switches to the digital signature mode at operation 318. In some example embodiments, the digital signature mode may correspond to a mode where a form processing application is configured to generate a static representation of the entire electronic form and maintain that representation in memory during the course of the associated form processing session. At operation 320, the signed content generator 216 may generate the static version of the XFA form that corresponds to the state of the form at the time of the request detected at operation 316. In one example embodiment, the system 200 may be configured to support a preview mode, where the content of the electronic form is generated and presented to user first so that the user may be permitted to see the generated content before the electronic form is signed and saved to disk. Subsequent to processing the request to digitally sign the XFA form, at operation 322, the XFA processing application switches to the direct rendering mode.

If it is determined, at operation 316, that the user input is not a request to digitally sign the XFA form, the XFA processing application updates the form in accordance with the detected input and applies the modifications to the form (e.g., by modifying the associated form object) at operation 314. In one example embodiment, the user may provide data by bringing a field of the electronic form into focus and then entering data. A field can be brought into focus, e.g., by using a mouse to select the field or by using keyboard sequences. The electronic form is then updated with the newly entered data. The XFA processing application executes calculations and data validations for any fields whose values have changed.

After the user no longer needs to interact with the electronic form, the user may request that the electronic form is closed and saved to disk. It will be noted that, according to an example embodiment, any changes that were made to the electronic form during an edit session are saved and stored separately from the template associated with the electronic form.

Figure 4:
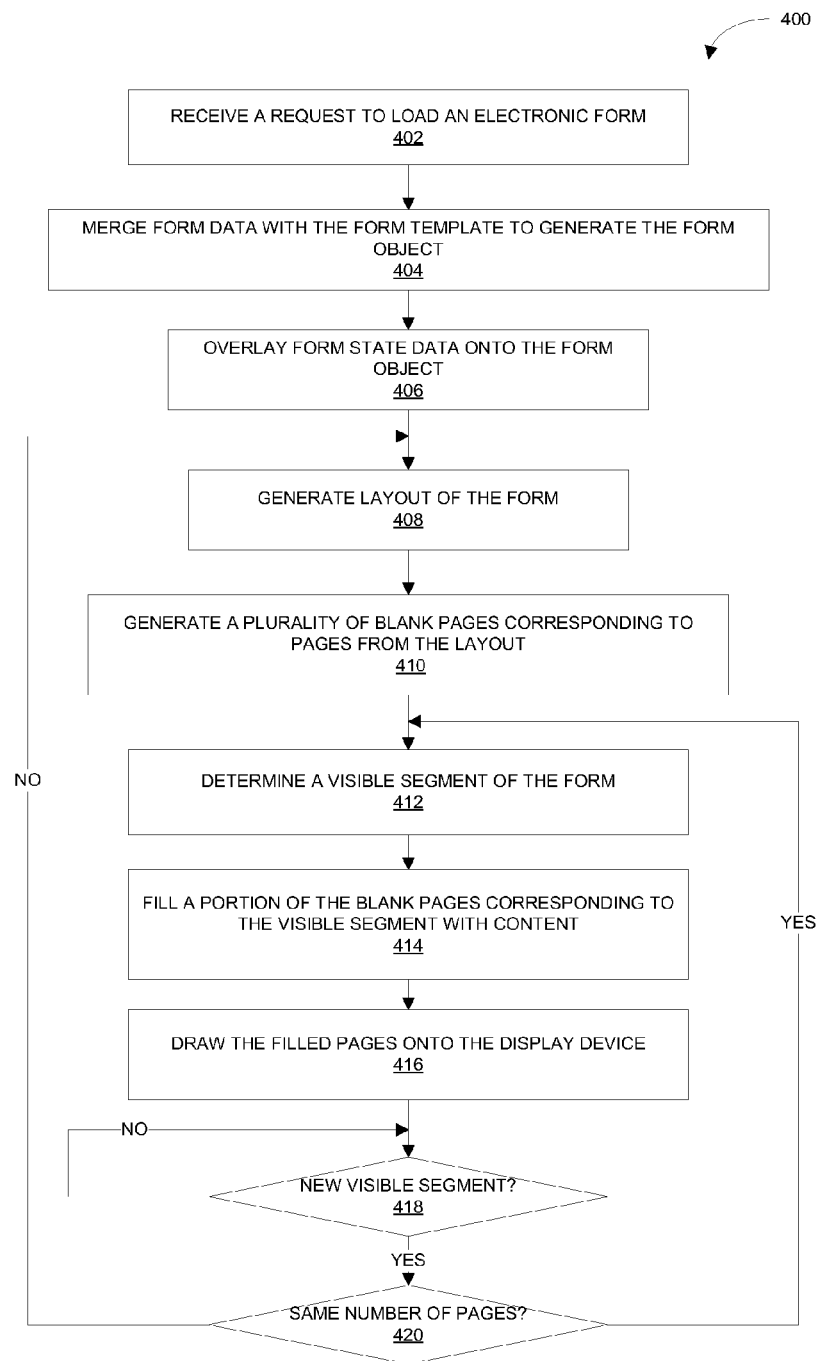
FIG. 4 is a flow chart illustrating a method, in accordance with an example embodiment, to direct render an electronic form.

FIG. 4 is a flow chart of a method 400 to direct render an electronic form, according to an example embodiment. The method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 1 and FIG. 2 described above.

As shown in FIG. 4, the method 400 commences at operation 402. At operation 402, the communications module 220 of FIG. 2 receives a request to load an electronic form when a user directs an XFA processing application to open an XFA form. At operation 404, the template associated with the electronic form is merged with any available associated application data and the resulting form object is overlaid with any session-related data associated with the electronic form at operation 406. The XFA processing application uses the XFA template (e.g., the template 110 of FIG. 1) to determine the initial XFA form appearance and to obtain any default data that is not specific to the user's application data. Application data (e.g., the application data 112 of FIG. 1) is then associated with specific fields in the XFA form. At operation 408, the processing logic generates a layout for the XFA form, the layout being suitable for generating pages for the XFA form. At operation 410, the blank pages generator generates blank pages corresponding to the layout of the XFA form. It will be noted that the layout generated at operation 408 may be utilized to generate blank pages for the XFA form, as well as to generate pages filled with the complete content of the XFA form.

At operation 412, the visible segment detector 204 determines which portion of the XFA form layout should be visible on a user's display device. Based on this determined information, the visible content generator 206 fills the blank pages (or one or more portions of the blank pages) with content, utilizing the form object that has been overlaid with session-related data (operation 414). The filled pages are drawn onto the user's display device, e.g., utilizing a graphics plug-in configured to cooperate with the XFA processing application, at operation 416. If the visible segment detector 204 determines, at operation 418, that a new segment of the electronic form needs to be presented on the associated display device, the visible segment detector 204 further determines, at operation 420, whether the number of pages associated with the electronic form has changed, e.g., an a result of user input. If it is determined, at operation 420, that the number of pages associated with the electronic form has changed, the method 400 proceeds to the layout operation 408 and a new layout is generated. If it is determined, at operation 420, that the number of pages associated with the electronic form has not changed, the method 400 proceeds to operation 412. Operations 412 through 416 are repeated every time a next visible segment of the XFA form is requested.

Figure 5:
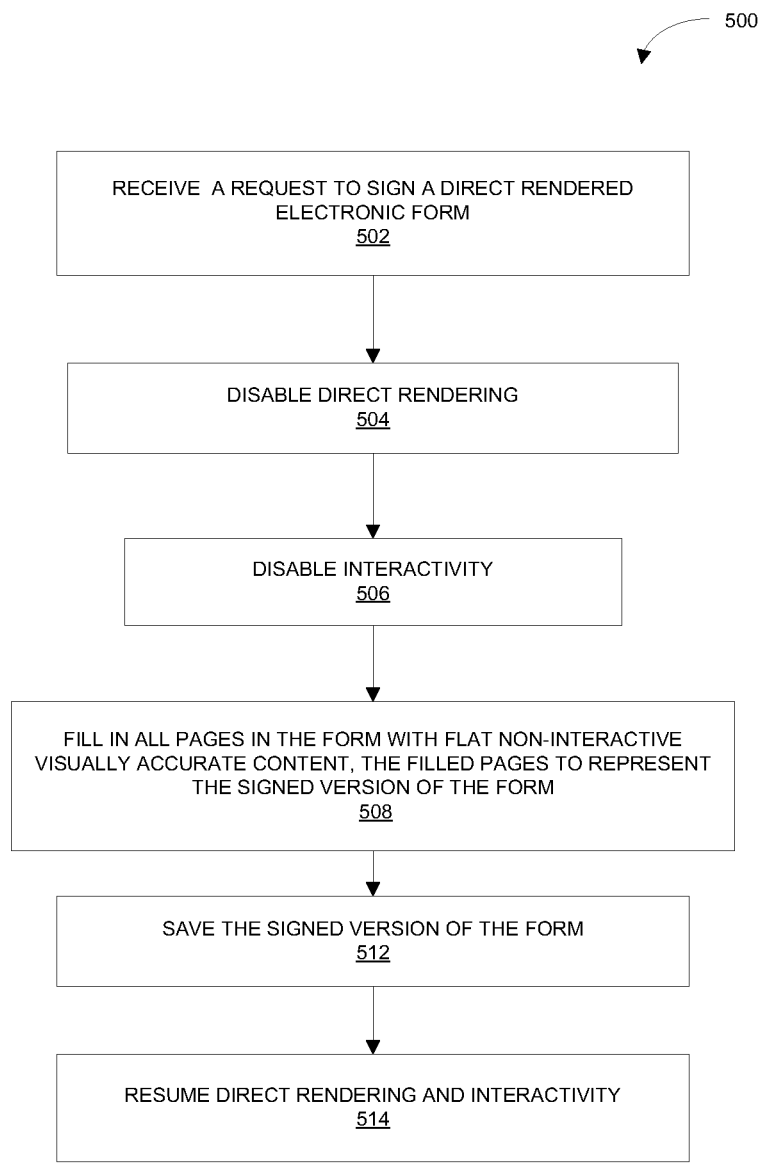
FIG. 5 is a flow chart illustrating a method, in accordance with an example embodiment, to digitally sign an electronic form.

FIG. 5 is a flow chart illustrating a method 500 to generate a digital signature for an electronic form, in accordance with an example embodiment. The method 500 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 1 and FIG. 2 described above.

As shown in FIG. 5, the method 500 commences at operation 502. At operation 502, the communications module 220 of FIG. 2 receives a request to digitally sign an electronic form that is being direct rendered. At operation 504, the suspend module 214 suspends direct rendering and any interactivity associated with the electronic form (operation 506). The signed content generator 216 fills all of the previously generated blank pages associated with the electronic form with the associated content at operation 508 to generate a static representation of the electronic form that reflects accurately the state of the form at the time the request to sign the form was issued. In one example embodiment, the operation 508 results in a representation of the entire form in the PDF format. The generated static representation of the electronic form is saved at operation 512 and the direct rendering is resumed at operation 514. In some embodiments, the processing logic may enter a preview mode where direct rendering is disabled and a user is permitted to view the static content generated at operation 508 before the signed form is saved to disk.

It will be noted that, although some example embodiments of the invention have been described in the context of the XFA architecture and PDF, the techniques herein may be utilized advantageously with a variety of applications related to providing electronic forms to users.

Figure 6:
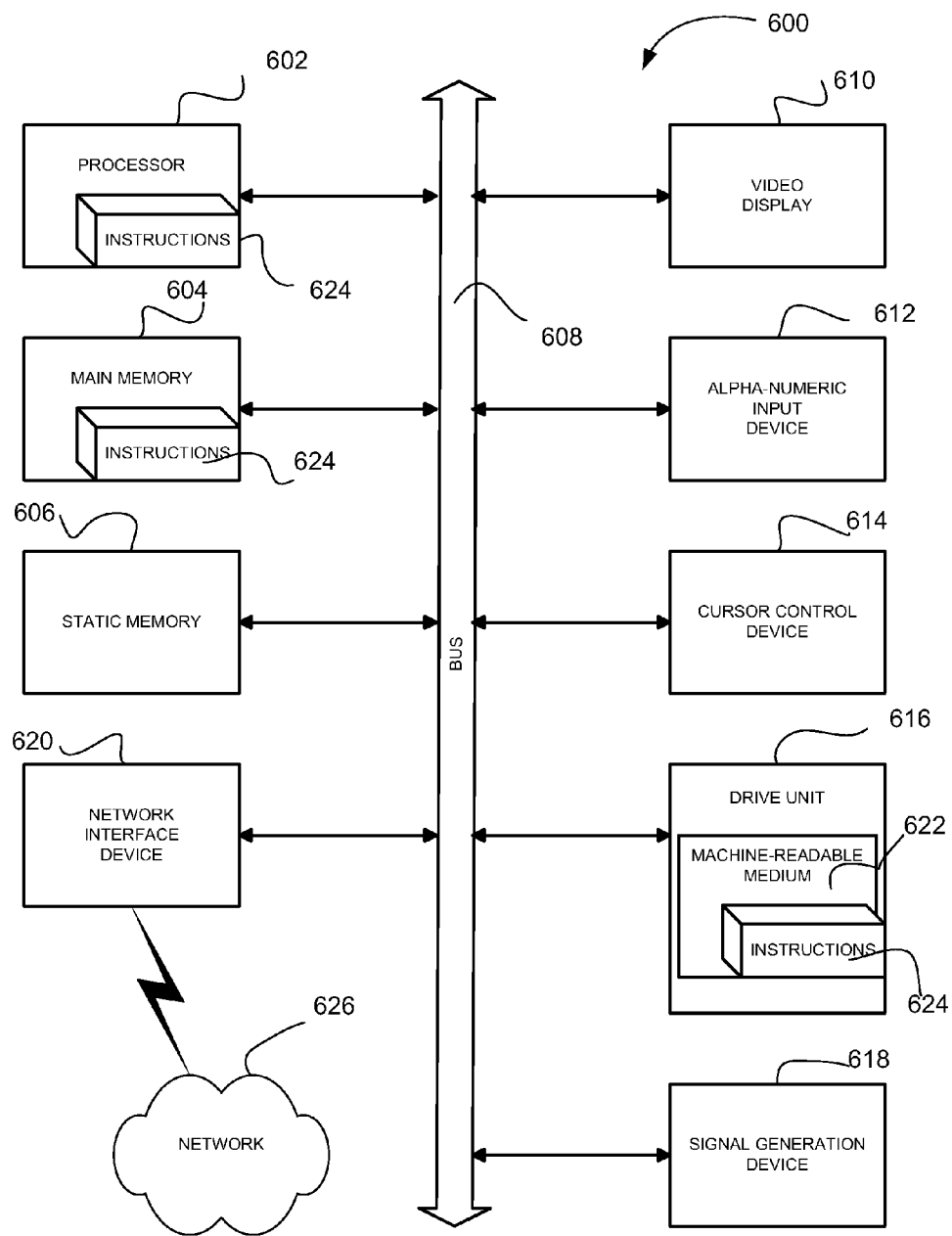
FIG. 6 illustrates a diagrammatic representation of a machine in the example form of a computer system within which a set of instructions, for causing the machine to perform any one or more of the methodologies discussed herein, may be executed.

FIG. 6 shows a diagrammatic representation of a machine in the example electronic form of a computer system 600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising a memory coupled to one or more processors for processing an electronic form having a first portion visible on a display device and a second portion not visible on the display device and for implementing:
   a visible content generator to generate the first portion of the electronic form, which is stored in memory and is displayed on the display device as a direct-rendered portion of the electronic form, the second portion being omitted from the memory and the direct-rendered portion;
   a communications module to receive a request to digitally sign the direct-rendered portion of the electronic form the electronic form;
   a suspend module, implemented using at least one processor, to respond to the request to sign the direct-rendered portion, which includes the first portion and omits the second portion, by suspending direct rendering and by generating a static representation of the electronic form including both the first portion and the second portion; and
   a signed content generator to generate a signed version of the electronic form including the first portion and the second portion.

2. The system of claim 1, wherein the system implements an interactivity module to suspend interactivity associated with the electronic form in response to the request to digitally sign the electronic form.

3. The system of claim 1, wherein the signed content generator is to save the signed version of the electronic form for later access.

4. The system of claim 1, wherein the system implements a resume module to resume direct rendering of the electronic form in response to determining that the request to digitally sign the electronic form has been processed.

5. The system of claim 1, wherein the system implements:
   a blank pages generator to generate blank content pages associated with the first portion and the second portion of the electronic form utilizing a layout generated for the electronic form;
   a visible segment detector to determine a visible segment of the electronic form;
   the visible content generator to:
      generate content associated with the visible segment of the electronic form,
      determine a portion of the blank content pages associated with the visible segment, and
      fill the portion of the blank content pages with the content associated with the visible segment of the electronic form; and
   a display module to display the filled portion of the blank content pages on a display device, the filled portion including the first portion.

6. The system of claim 5, wherein the visible segment detector is to determine a new visible segment of the electronic form.

7. The system of claim 6, wherein the system implements an invalidator to invalidate the filled portion of the blank content pages in response to the visible segment detector determining the new visible segment of the electronic form.

8. The system of claim 6, wherein the blank pages generator is to generate the blank content pages including one or more signature fields.

9. The system of claim 8, wherein the one or more signature fields are created as portable document format (PDF) annotations.

10. A method comprising:
   storing information associated with an electronic form, the information including a form template, application data, and session-related data;
   identifying a first portion of the electronic form to be presented on a display device in a first view, the first portion including a first portion of the form template, a first portion of the application data, and a first portion of the session-related data, wherein a second portion of the electronic form is not to be presented on the display device in the first view and includes a second portion of the form template, a second portion of the application data, and a second portion of the session-related data;
   storing a direct-rendered version of the electronic form in memory, the direct-rendered version including the first portion of the form template, the first portion of the application data, and the first portion of the session-related data, and the direct-rendered version omitting from the memory the second portion of the form template, the second portion of the application data, and the second portion of the session-related data, wherein the direct-rendered version is presented on the display device;
   receiving a request to input a digital signature when the direct-rendered version is presented on the display device, the direct-rendered version including the first portion of the electronic form and omitting the second portion of the electronic form;
   responding to the request to input the digital signature by suspending a direct-rendering mode by generating a static representation of the electronic form including both the first portion and the second portion of the form template, the application data, and the session-related data;

generating and storing a signed version of the electronic form with the static representation of the electronic form.

11. The method of claim 10, wherein the suspending of direct rendering comprises suspending interactivity associated with the electronic form.

12. The method of claim 10, comprising:
  detecting that the request to digitally sign an electronic form has been processed; and
  resuming direct rendering in response to the detecting that the request to digitally sign an electronic form has been processed.

13. The method of claim 10, wherein the direct rendering of the electronic form comprises:
  generating blank content pages associated with the electronic form utilizing a layout generated for the electronic form;
  filling the portion of the blank content pages with content associated with the first portion of the electronic form; and
  displaying the filled portion of the blank content pages on a display device.

14. The method of claim 10, comprising:
  generating one or more signature fields, the one or more signature fields created as portable document format (PDF) annotations; and
  associating the form template with the one or more signature fields.

15. The method of claim 10, wherein the signed version of the electronic form is a representation of the electronic form in a Portable Document Format (PDF).

16. The method of claim 10, wherein the electronic form comprises one or more static elements and one or more interactive elements.

17. A machine-readable non-transitory medium having instruction data to cause a machine to:
  store information associated with an electronic form, the information including a form template, application data, and session-related data;
  identify a first portion of the electronic form to be presented on a display device during a first viewing event, the first portion including a first portion of the form template, a first portion of the application data, and a first portion of the session-related data, wherein a second portion of the electronic form is not to be presented on the display device during the first viewing event and includes a second portion of the form template, a second portion of the application data, and a second portion of the session-related data;
  store a direct-rendered version of the electronic form in memory, the direct-rendered version including the first portion of the form template, the first portion of the application data, and the first portion of the session-related data, and the direct-rendered version omitting from the memory the second portion of the form template, the second portion of the application data, and the second portion of the session-related data,
  present the direct-rendered version on the display device;
  receive a request to input a digital signature during the first viewing event when the direct-rendered version is presented on the display device;
  respond to the request to input the digital signature by suspending a direct-rendering mode by generating a static representation of the electronic form including both the first portion and the second portion of the form template, the application data, and the session-related data;
  generate a signed version of the electronic form with the static representation of the electronic form.

18. The machine-readable non-transitory medium of claim 17, wherein the instruction data cause the machine to:
  detecting that the request to input the digital signature has been processed; and
  resume the direct-rendering mode in response to the detecting that the request to digitally sign an electronic form has been processed, the direct rendering including storing in memory only a visible portion of the electronic form and omitting from the memory non visible portions of the electronic form.

* * * * *